(12) United States Patent
Urakawa

(10) Patent No.: US 8,508,759 B2
(45) Date of Patent: Aug. 13, 2013

(54) COMMUNICATION APPARATUS FOR DISPLAYING A SCREEN USING SCREEN DATA AND PROGRAM OF COMMUNICATION APPARATUS

(75) Inventor: Yutaka Urakawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 28 days.

(21) Appl. No.: 13/289,922

(22) Filed: Nov. 4, 2011

(65) Prior Publication Data

US 2012/0113454 A1 May 10, 2012

(30) Foreign Application Priority Data

Nov. 4, 2010 (JP) .................................. 2010-247403

(51) Int. Cl.
  *G06F 3/12* (2006.01)
  *G06F 3/048* (2013.01)
  *G06K 15/00* (2006.01)
  *G09G 5/00* (2006.01)
  *G09G 5/36* (2006.01)

(52) U.S. Cl.
  USPC ........ 358/1.13; 358/1.15; 358/1.16; 715/788; 715/793; 345/156; 345/553

(58) Field of Classification Search
  None
  See application file for complete search history.

(56) References Cited

U.S. PATENT DOCUMENTS

| | | | |
|---|---|---|---|
| 8,341,541 B2* | 12/2012 | Holecek et al. | 715/782 |
| 2006/0165456 A1* | 7/2006 | Matsunaga et al. | 400/62 |
| 2008/0246989 A1* | 10/2008 | Konuma | 358/1.15 |
| 2009/0228813 A1 | 9/2009 | Sekiguchi | |
| 2011/0083095 A1* | 4/2011 | Konuma | 715/772 |
| 2011/0134453 A1* | 6/2011 | Sakiyama | 358/1.13 |
| 2011/0242592 A1* | 10/2011 | Tamura | 358/1.15 |
| 2011/0310429 A1* | 12/2011 | Koike | 358/1.15 |

FOREIGN PATENT DOCUMENTS

JP 2009-207872 A 9/2009

* cited by examiner

*Primary Examiner* — Hilina K Demeter
(74) *Attorney, Agent, or Firm* — Baker Botts L.L.P.

(57) ABSTRACT

A communication apparatus includes a first reception unit which receives an instruction from a server, a second reception unit which receives an instruction from a path other than the server, an executing unit which executes a function when the first reception unit receives a first execution instruction from the server or when the second reception unit receives a second execution instruction from the path other than the server, and a display control unit which displays a display instruction correspondence screen when the first reception unit receives a display instruction from the server, and which displays an execution correspondence screen when the executing unit executes the function. During a time period while the display instruction correspondence screen is being displayed, the display control unit displays the execution correspondence screen when receiving the first execution instruction, but doesn't display the execution correspondence screen when receiving the second execution instruction.

4 Claims, 8 Drawing Sheets

FIG. 5

| SCREEN DATA | SCREEN TYPE | STACKABLE INFORMATION |
|---|---|---|
| 2009.12.25 12:23AM / MESSAGE / FAX CONFIRMATION / MENU | STANDBY SCREEN | ALLOW TO STACK SCREENS OF ALL OF SCREEN TYPES THEREON |
| PROCESSING... | PROCESSING SCREEN (FIRST TYPE) | ALLOW TO STACK SCREENS OF ALL OF SCREEN TYPES THEREON |
| PROCESSING... | PROCESSING SCREEN (SECOND TYPE) | ALLOW TO STACK ONLY SERVER INSTRUCTION SCREEN THEREON |
| PRINTING / PRINTING ○○○● | EXECUTING SCREEN | ALLOW TO STACK ONLY MENU OPERATION SCREEN AND PROCESSING SCREEN (SECOND TYPE) THEREON |
| PRINTING OPTIONS / PREVIOUS / ENTER / SHEET TYPE / SHEET SIZE / PRINT QUALITY | SERVER INSTRUCTION SCREEN | TOP SCREEN (NOT ALLOW TO STACK SCREENS OF ANY SCREEN TYPE THEREON) |
| SELECT ACCOUNT / NEW / xxx_xxx@abc.com / yyy_yyy@def.com | MENU OPERATION SCREEN | TOP SCREEN (NOT ALLOW TO STACK SCREENS OF ANY SCREEN TYPE THEREON) |

TB11, 110, 111, 112

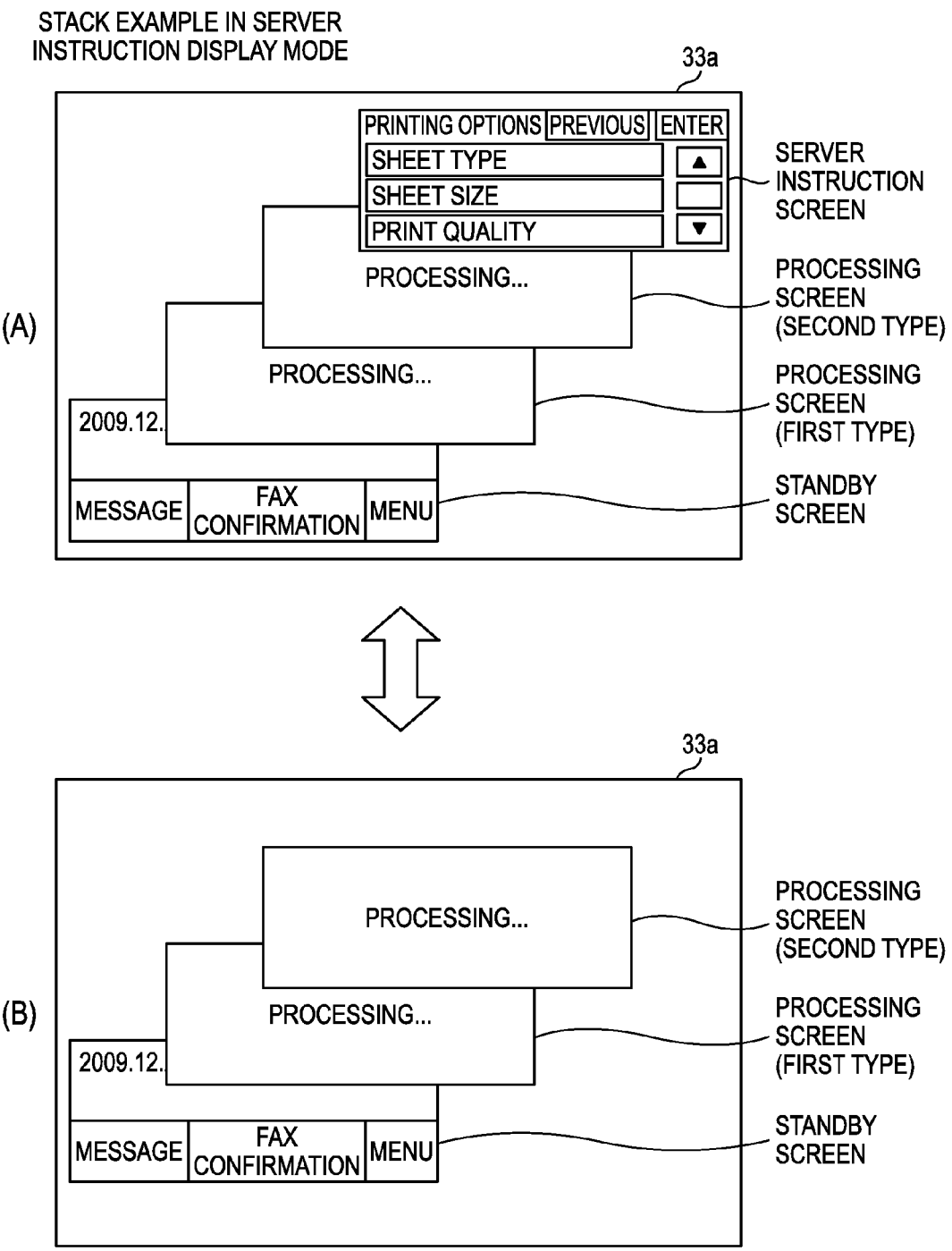

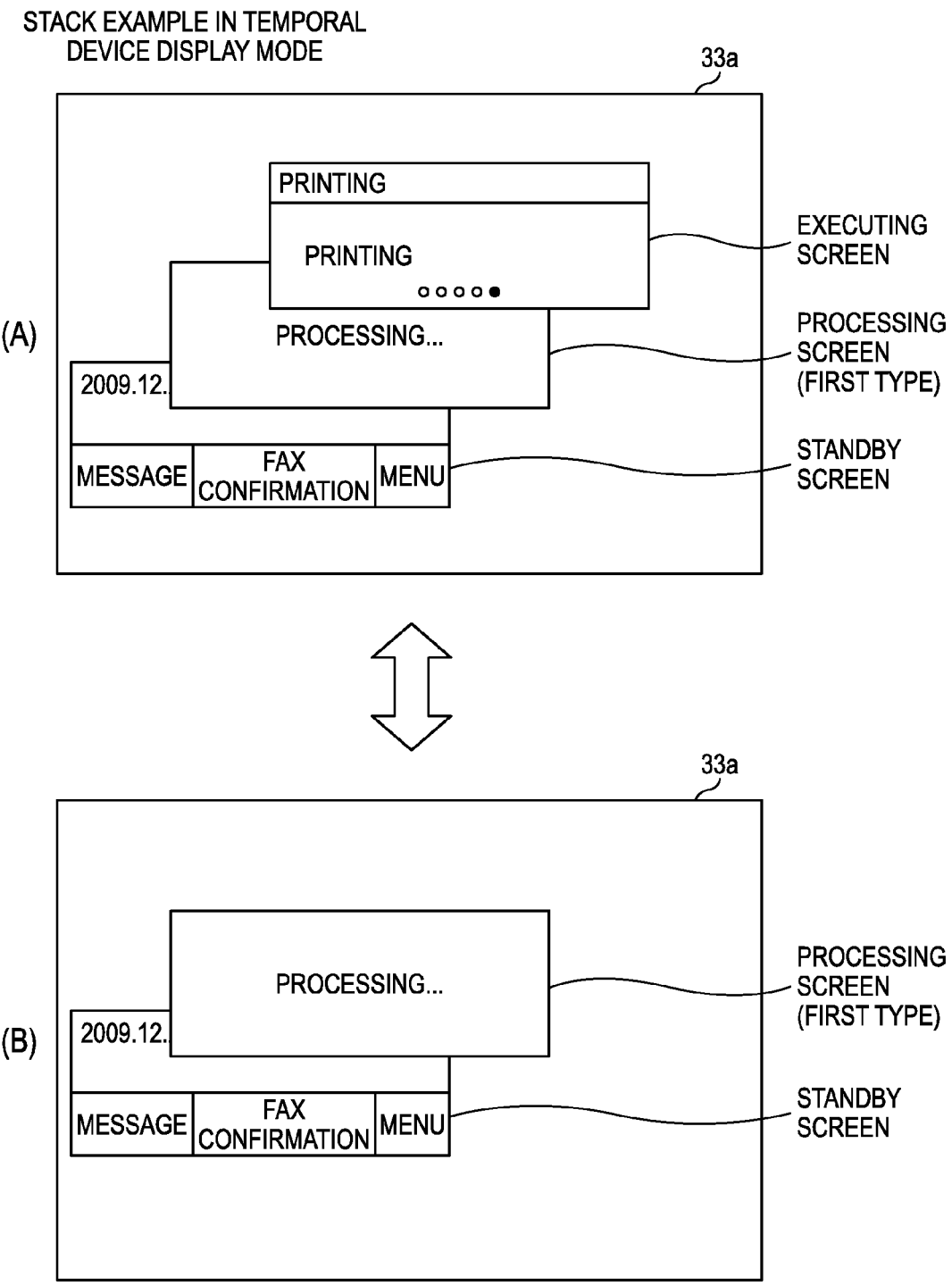

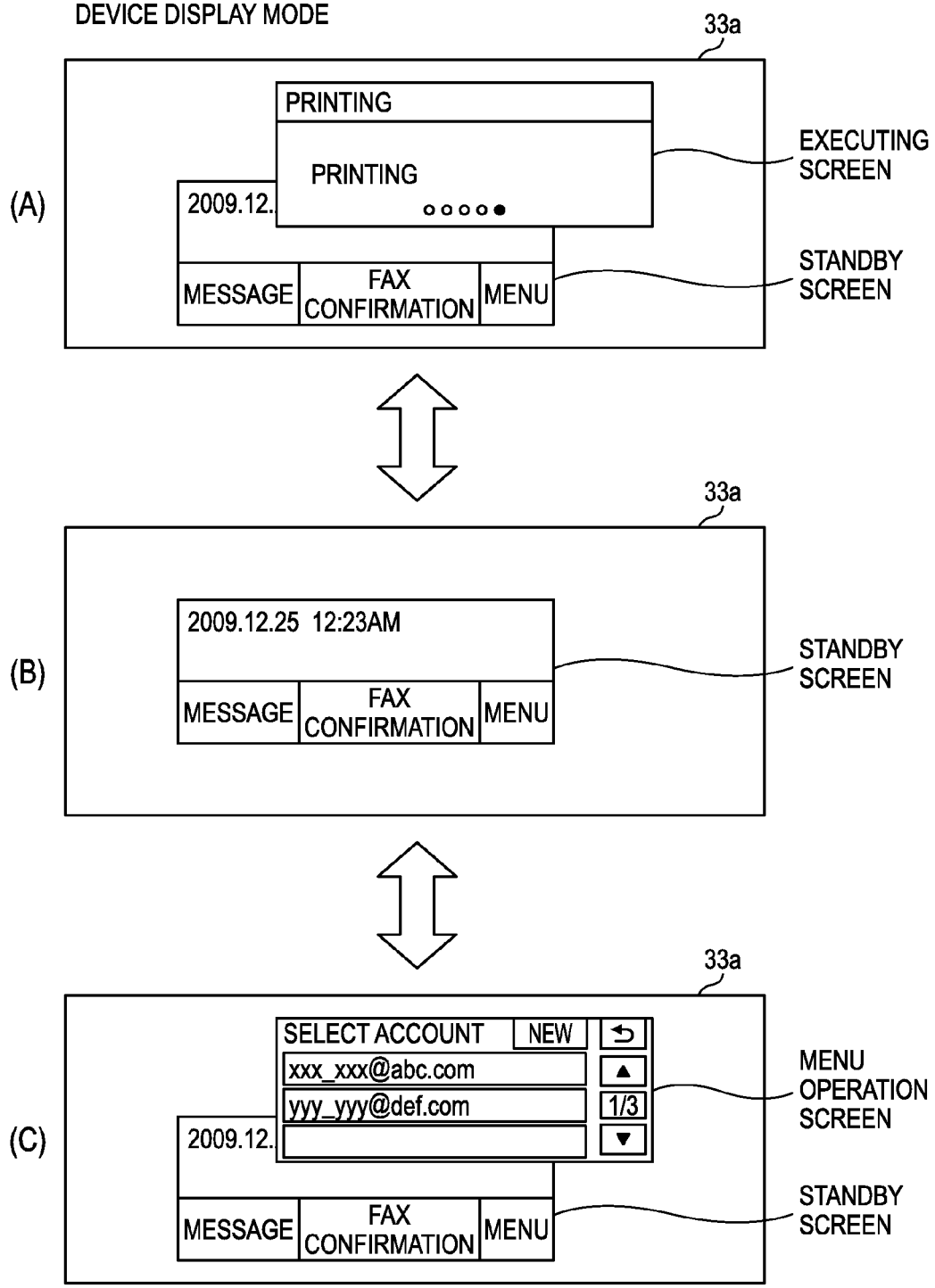

COMMUNICATION APPARATUS FOR DISPLAYING A SCREEN USING SCREEN DATA AND PROGRAM OF COMMUNICATION APPARATUS

CROSS-REFERENCE TO RELATED APPLICATION

This application claims priority from Japanese Patent Application No. 2010-247403, filed on Nov. 4, 2010, the entire subject matter of which is incorporated herein by reference.

TECHNICAL FIELD

Aspects of the present invention relate to a communication apparatus for displaying a screen using screen data, and a program of the communication apparatus.

BACKGROUND

JP-A-2009-207872 describes a communication apparatus which receives graphical user interface (GUI) screen parameter information which is transmitted from a transmitter device. The communication apparatus generates a GUI screen based on the received GUI screen parameter information, and displays the GUI screen on a display unit of the communication apparatus.

SUMMARY

The communication apparatus may be configured to display a GUI screen on the display unit even if information is input from, for example, a device other than the transmitter device or a built-in timer or input unit of the communication apparatus. In this case, if a GUI screen displayed in response to trigger information which is transmitted from the transmitter device and a GUI screen displayed in response to trigger information which is input from a device other than the transmitter device are displayed together, it may become confusing for a user to recognize which information a displayed GUI screen is based on. Accordingly, an aspect of the present invention provides a technique capable of solving those inconveniences.

According to an illustrative embodiment of the present invention, there is provided a communication apparatus comprising: a first reception unit configured to receive an instruction from a server connected to a network; a second reception unit configured to receive an instruction from a path other than the server; a function executing unit configured to execute a function any of when the first reception unit receives a first execution instruction from the server and when the second reception unit receives a second execution instruction from the path other than the server; and a display control unit configured to display a display instruction correspondence screen on a display unit when the first reception unit receives a display instruction from the server, and configured to display an execution correspondence screen on the display unit when the function executing unit executes the function, wherein during a time period while the display instruction correspondence screen is being displayed, the display control unit displays the execution correspondence screen on the display unit when the first reception unit receives the first execution instruction, but does not display the execution correspondence screen on the display unit when the second reception unit receives the second execution instruction.

According to above configuration, during the time period while a screen is being displayed in response to a display instruction received from the server, any screens based on an execution instruction input from the path other than the server is not displayed. Therefore, when a screen based on a display instruction which is transmitted from the server and acts as a trigger is being displayed, even if a function is executed by an execution instruction from a path other than the server, it is possible to prevent an execution correspondence screen corresponding to the function from being displayed. Therefore, it is easy for the user to recognize whether a displayed screen is based on an instruction (a display instruction or an execution instruction) from the server, and thus convenience for the user can be improved.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIG. 5 is a diagram illustrating an example of an image data storage table;

FIG. 6 is a diagram illustrating a first stack example of a screen data storage area;

FIG. 7 is a diagram illustrating a second stack example of the screen data storage area; and FIG. 8 is a diagram illustrating a third stack example of the screen data storage area.

DETAILED DESCRIPTION

<Outline of Service Cooperation System 10>

Figure 1:
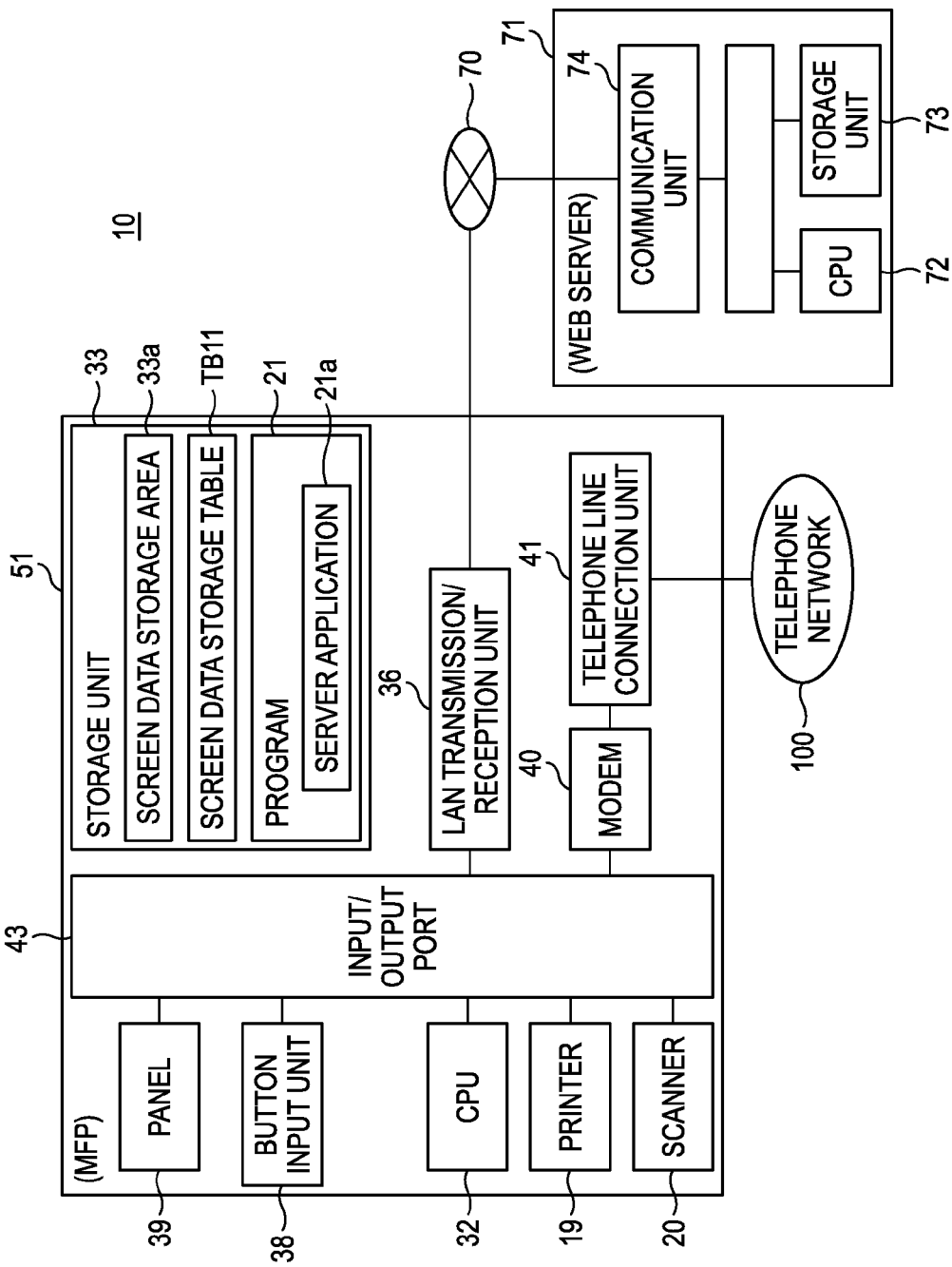
FIG. 1 is a block diagram illustrating a configuration of a service cooperation system.

An outline of a service cooperation system 10 according to an illustrative embodiment of the present invention will be described with reference to FIG. 1. The service cooperation system 10 includes a multifunction peripheral (MFP) 51 and a web server 71. The MFP 51 and the web server 71 are connected to each other through the Internet 70.

The web server 71 executes communication with other terminals connected to the Internet, based on HTTP or HTTPS, so as to provide predetermined services to other terminals. An example of the services provided by the web server 71 includes an electric-file storing service. The electric-file storing service is a service in which it is enabled to store electric files in a database provided on the network by a service provider. Examples of the electric-file storing service include a Picasa (a registered trademark) web album, and flickr (a registered trademark).

In a service provided by the web server 71, the web server 71 may issue a server execution instruction or a server display instruction to the MFP 51. The contents of the server execution instruction or the server display instruction will be described below.

<Configuration of MFP 51>

A configuration of the MFP 51 will be described. The MFP 51 includes a printer 19, a scanner 20, a CPU 32, a storage unit 33, a LAN transmission/reception unit 36, a button input unit 38, a panel 39, a modem 40, and a telephone line connection unit 41. These components are communicably connected to each other through an input/output port 43.

The CPU 32 controls each function in accordance with a program stored in the storage unit 33, various signals transmitted and received through the LAN transmission/reception unit 36, and the like. The storage unit 33 may include a random access memory (RAM), a read only memory (ROM), a flash memory, a hard disk (HDD), and the like.

The LAN transmission/reception unit 36 transmits and receives digital signals configuring various kinds of data to and from the web server 71 through the Internet 70. The button input unit 38 is keys for executing each function of the MFP 51. The button input unit 38 may be integrated with a panel 39 as a touch panel. The panel 39 displays various kinds of function information of the MFP 51.

The printer 19 is a device configured to execute printing upon receiving an internal execution instruction for executing printing. The scanner 20 is a device configured to execute reading upon receiving an internal execution instruction for executing reading. The internal execution instructions are output from the button input unit 38, a telephone network 100, a personal computer (not shown) connected to the MFP 51, a built-in timer (not shown) of the MFP 51, and the like. The modem 40 modulates document data to be transmitted by a facsimile function into a signal capable of being transmitted in the telephone network 100 and transmits the modulated signal through the telephone line connection unit 41, and receives a signal input from the telephone network 100 through the telephone line connection unit 41 and demodulates the input signal into document data.

The storage unit 33 includes a screen data storage area 33a, an image data storage table TB11, and a program 21. The screen data storage area 33a is an area where various kinds of screen data are stored in a stack data structure. The stack data structure is a data structure having a feature that the last input data is the first output. When data is input, new data is stacked at the top. When the data is output, the data stacked at the top is firstly output. This last-in first-out data input/output type is called Last In First Out (LIFO).

Contents stored in the screen data storage area 33a are updated by pushing and popping which are two types of basic operation. The CPU 32 can access only image data at the top of the screen data storage area 33a, and cannot access the other image data. If new image data is stacked (pushed), the new image data becomes the top of the stack, so that the CPU 32 cannot access the image data under the top. If image data is removed (popped) from the stack, the second image data becomes the top of the stack.

The CPU 32 reads screen data stacked at the top of the screen data storage area 33a, and displays a screen on the panel 39 based on the read screen data. Screen display on the panel 39 may be controlled by, as a trigger, reception of a server display instruction from the web server 71, reception of an internal execution instruction, and the like.

FIG. 5 shows an example of the image data storage table TB 11. The image data storage table TB 11 stores screen data 110, screen types 111, and stackable information 112. Specifically, the screen types 111 have six types including a 'standby screen', a 'processing screen (first type)', a 'processing screen (second type)', an 'executing screen', a 'server instruction screen', and a 'menu operation screen'. The 'standby screen' is a screen displayed when the MFP 51 is in a standby status. The 'processing screen (first type)' and the 'processing screen (second type)' are screens displayed when the MFP 51 is in communication with the web server 71. The 'executing screen' is a screen displayed when the MFP 51 is executing a function such as a printing operation. The 'server instruction screen' is a screen displayed according to a display instruction from the web server 71. The 'menu operation screen' is a screen displayed by operation of the user on the button input unit 38, or the like.

The screen data 110 is provided in correspondence with each of the screen types 111. The screen data 110 is data for generating screens to be displayed on the panel 39. FIG. 5 shows screen examples of the screen data 110 corresponding to the screen types 111.

The stackable information 112 is a condition representing, on each screen data, which screen data among screen data of the screen types 111 is allowed to be stacked. Specifically, the 'standby screen' allows screens of all of the screen types 111 to be stacked thereon. The 'processing screen (first type)' allows screens of all of the screen types 111 to be stacked thereon. Therefore, the 'executing screen' can be stacked on the 'processing screen (first type)'. The 'processing screen (second type)' allows only the 'server instruction screen' to be stacked thereon. Therefore, the 'executing screen' cannot be stacked on the 'processing screen (second type)'. The 'executing screen' allows only the 'menu operation screen' and the 'processing screen (second type)' to be stacked thereon. The 'server instruction screen' is considered as a top screen which does not allow screens of any screen types 111 to be stacked thereon. The 'menu operation screen' is also considered as a top screen which does not allow screens of any screen types 111 to be stacked thereon.

The storage unit 33 stores the program 21. The CPU 32 executes a process according to the program 21 of the storage unit 33. The program 21 includes a server application 21a. The server application 21a is an application for receiving a server execution instruction and a server display instruction from the web server 71 and causing the MFP 51 to execute a function according to the received instruction. The server execution instruction is an instruction for causing the MFP 51 to execute a printing operation using the printer 19, a reading operation using the scanner 20, or the like. The server display instruction is an instruction for causing the MFP 51 to display the 'server instruction screen' on the panel 39.

A configuration of the web server 71 will be described. The web server 71 includes a CPU 72, a storage unit 73, and a communication unit 74. The web server 71 is a device providing a function or data of the web server 71 to the MFP 51 on a network. The CPU 72 controls each function. The storage unit 73 stores various kinds of data. The communication unit 74 transmits and receives various kinds of information to and from the MFP 51.

<Operation of MFP 51>

Figure 3:
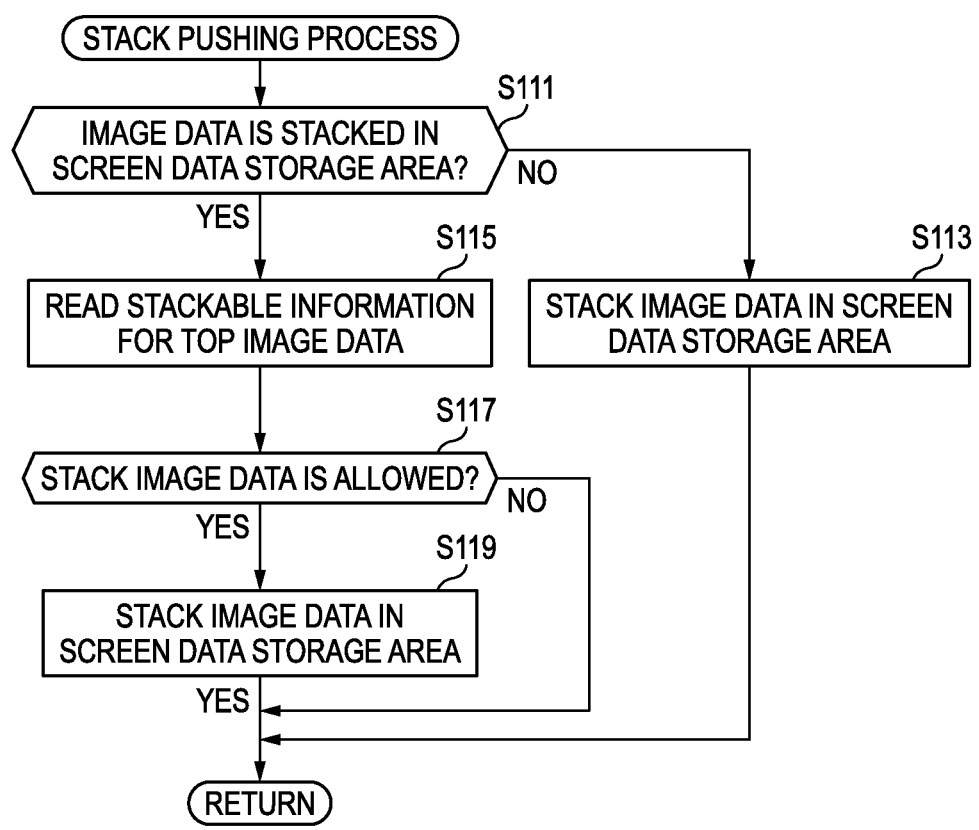
FIG. 3 is a flow chart illustrating a second operation of the MFP.
Figure 4:
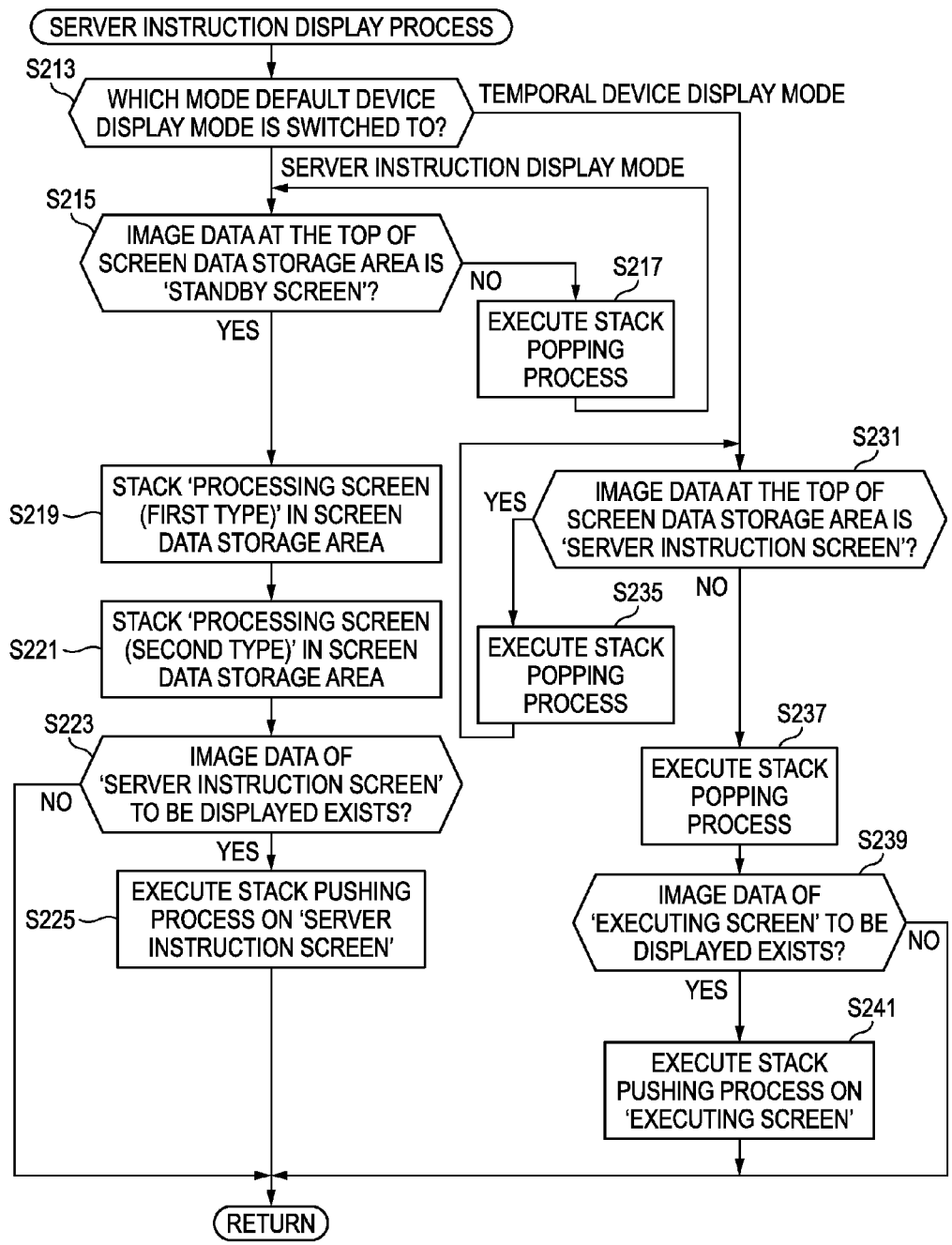
FIG. 4 is a flow chart illustrating a third operation of the MFP.

An operation of the MFP 51 according to the present illustrative embodiment will be described with reference to flow charts of FIGS. 2 to 4 and stack examples of FIGS. 6 to 8. The MFP 51 has three display modes of a default device display mode, a server instruction display mode, and a temporal device display mode.

The default device display mode is a mode for displaying a screen on the panel 39 in accordance with an internal execution instruction. In the default device display mode, among the six screen types 111 stored in the image data storage table TB11, three types of the 'standby screen', the 'executing screen', and the 'menu operation screen' can be displayed.

The server instruction display mode is a mode for displaying a screen on the panel 39 in accordance with the server display instruction from the web server 71. In the server instruction display mode, among the six screen types 111 stored in the image data storage table TB11, two types of the 'processing screen (second type)' and the 'server instruction screen' can be displayed.

The temporal device display mode is a mode of a case where the server execution instruction is received from the web server 71 while the server display instruction is being received from the web server 71. In the temporal device display mode, among the six screen types 111, two types of the 'processing screen (first type)' and the 'executing screen' can be displayed.

Figure 2:
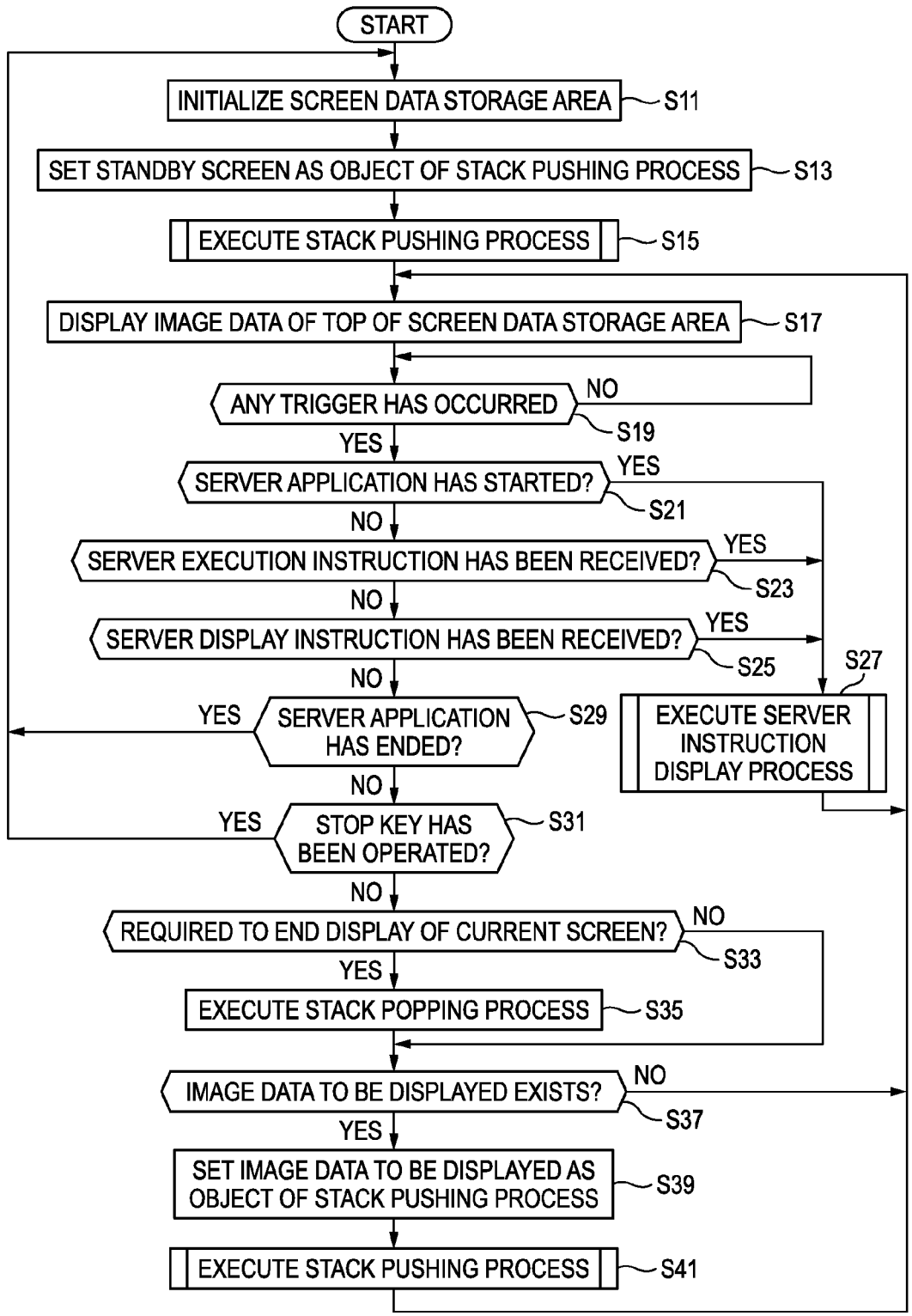
FIG. 2 is a flow chart illustrating a first operation of a multifunction peripheral (MFP)

FIG. 2 shows an operation flow in the default device display mode. The flow of FIG. 2 operates for a time period while the MFP 51 is powered on. FIG. 4 shows an operation flow in the server instruction display mode and the temporal device display mode. FIGS. 6 to 8 show stack examples of image data into the screen data storage area 33*a* in the server instruction display mode, the temporal device display mode, and the default device display mode, respectively.

In step S11 of FIG. 2, the CPU 32 initializes the screen data storage area 33*a*. Therefore, the screen data storage area 33*a* becomes a state where no image data is stored. In step S13, the CPU 32 sets screen data of the 'standby screen' as an object of a stack pushing process. Then, the CPU 32 reads image data of the 'standby screen' from the image data storage table TB 11. In step S15, the CPU 32 executes the stack pushing process on the image data of the 'standby screen'.

The stack pushing process executed in step S15 will be described with reference to a flow chart of FIG. 3. In step S111, the CPU 32 determines whether any screen data is already stacked in the screen data storage area 33*a*. If it is determined that any screen data is not stacked (No in step S111), the stack pushing process proceeds to step S113. In step S113, the CPU 32 stacks image data, which is the object of the stack pushing process, in the screen data storage area 33*a*. Then, the stack pushing process ends.

Meanwhile, if image data is stacked in the screen data storage area 33*a* (Yes in step S111), the stack pushing process proceeds to step S115. In step S115, the CPU 32 reads the stackable information 112 for image data stacked at the top in the screen data storage area 33*a*.

In step S117, the CPU 32 determines whether the image data, which is the object of the current stack pushing process, is allowed to be stacked on the image data currently stacked at the top. This determination is made by checking whether the screen type 111 of the image data, which is the object of the stack pushing process, matches a stackable type as defined in the stackable information 112. If it is determined that the screen type 111 of the image data, which is the object of the stack pushing process, does not match any stackable type of the stackable information 112 (No in step S117), step S119 is skipped, and the stack pushing process proceeds to step S17 (FIG. 2). Therefore, the image data, which is the object of the stack pushing process, is not stacked in the screen data storage area 33*a*. On the other hand, if it is determined that the screen type 111 of the image data, which is the object of the stack pushing process, matches a stackable type of the stackable information 112 (Yes in step S117), the stack pushing process proceeds to step S119 where the image data, which is the object of the stack pushing process, is stacked in the screen data storage area 33*a*. Then, the stack pushing process ends.

In an example of the present illustrative embodiment, the image data of the 'standby screen' is stacked in the screen data storage area 33*a* by the stack pushing process of step S15, as shown in (B) of FIG. 8.

Returning to the description of the flow of FIG. 2, in step S17, the CPU 32 reads image data stacked at the top of the screen data storage area 33*a*, and displays the image data on the panel 39.

In step S19, the CPU 32 determines whether any trigger for switching a screen which is being displayed on the panel has occurred. Examples of the trigger include start and end of the server application 21*a*, reception of a server execution instruction, an operation of a stop key, reception of a server display instruction, reception of an internal execution instruction, and the like. The internal execution instruction is an instruction for executing the printing operation, the reading operation, or the like in the MFP 51 and is input from, for example, a device other than the web server 71 or a built-in timer or button input unit of the MFP 51. If any trigger has not been occurred (No in step S19), the CPU 32 returns to step S19 and stands by, and if a trigger has occurred (Yes in step S19), the CPU 32 proceeds to step S21. In step S21, the CPU 32 determines whether the server application 21*a* has started. If the server application 21*a* has started (Yes in step S21), the CPU 32 proceeds to step S27, and if the server application 21*a* has not started (No in step S21), the CPU 32 proceeds to step S23.

In step S23, the CPU 32 determines whether any server execution instruction has been received from the web server 71. If a server execution instruction has been received (Yes in step S23), the CPU 32 proceeds to step S27, and if any server execution instruction has not been received (No in step S23), the CPU 32 proceeds to step S25.

In step S25, the CPU 32 determines whether any server display instruction has been received from the web server 71. If a server display instruction has been received (Yes in step S25), the CPU 32 proceeds to step S27, and if any server display instruction has not been received (No in step S25), the CPU 32 proceeds to step S29.

In step S29, the CPU 32 determines whether the server application 21*a* has ended. If the server application 21*a* has ended (Yes in step S29), the CPU 32 returns to step S11, and if the server application 21*a* has not ended (No in step S29), the CPU 32 proceeds to step S31.

In step S31, the CPU 32 determines whether the stop key of the panel 39 has been operated by the user. If the stop key has been operated (Yes in step S31), the CPU 32 returns to step S11, and if the stop key has not been operated (No in step S31), the CPU 32 proceeds to step S33.

In step S33, the CPU 32 determines whether it is required to end the display of the current screen on the panel 39. A case where it is required to end the display of the current screen may be a case where screen switch is required, for example, a case where a function according to an internal execution instruction starts or ends or a case where a new internal execution instruction is received. Specifically, in a printing operation, the case where it is required to end the display of the current screen may be a case where it is required switching from a 'executing screen' which displays 'READING PRINT DATA' when the print data is being read to a 'executing screen' which displays 'PRINTING' if the operation is switched to printing on a sheet, a case where the printing ends and thus the display of the 'executing screen' becomes unnecessary, and the like. If it is not required to end the display of the current screen (No in step S33), step S35 is skipped, and the CPU 32 proceeds to step S37. On the other hand, if it is required to end the display of the current screen (Yes in step S33), the CPU 32 proceeds to step S35 so as to remove the image data of the current screen on the panel 39 from the screen data storage area 33*a* (a stack popping process).

In step S37, the CPU 32 determines whether image data attempting to be displayed on the panel 39 exists. Examples of the image data attempting to be displayed include the 'executing screen' and the 'menu operation screen' which are displayed in the internal execution instructions. If image data attempting to be displayed does not exit (No in step S37), the CPU 32 returns to step S17, and if image data attempting to be displayed exits (Yes in step S37), the CPU 32 proceeds to step S39. In step S39, the CPU 32 sets the image data attempting to be displayed as an object of the stack pushing process. Then, in step S41, the CPU 32 executes the stack pushing process. Contents of the stack pushing process of step S41 are the same as those of the stack pushing process of step S15, and thus the detailed description will be omitted. Next, the CPU 32 returns to step S17.

In the example of the present illustrative embodiment, if the image data to be displayed is the 'executing screen', image data of the 'executing screen' is stacked in the screen data storage area 33a by the stack pushing process of step S15. Therefore, the stack state transitions from a state of (B) of FIG. 8 to a state of (A) of FIG. 8. If the image data to be displayed is the 'menu operation screen', image data of the 'menu operation screen' is stacked in the screen data storage area 33a by the stack pushing process of step S15. Therefore, the stack state transitions from a state of (B) of FIG. 8 to a state of (C) of FIG. 8.

<Server Instruction Display Process>

A server instruction display process executed in step S27 will be described with reference to FIG. 4. In step S213, the CPU 32 determines whether to switch the default device display mode to the server instruction display mode or the temporal device display mode. If it is determined to switch the default device display mode to the server instruction display mode, the CPU 32 proceeds to step S215. Examples of the case where it is determined to switch the default device display mode to the server instruction display mode include the case where the server application has started (Yes in step S21) and the case where a server display instruction has been received (Yes in step S25).

In step S215, the CPU 32 determines whether the screen type 111 of the image data stacked at the top of the screen data storage area 33a is the 'standby screen'. If the image data stacked at the top is not the 'standby screen' (No in step S215), the CPU 32 proceeds to step S217 so as to execute a stack popping process (a process of removing the image data stacked at the top of the screen data storage area 33a). Then, the CPU 32 returns to step S215. If the image data stacked at the top is the 'standby screen' (Yes in step S215), the CPU 32 proceeds to step S217. Therefore, the stack popping process can be repeated until the 'standby screen' is stacked at the top of the screen data storage area 33a (for example, the state of (B) of FIG. 8).

In step S219, the CPU 32 stacks the screen data of the 'processing screen (first type)' at the top of the screen data storage area 33a. Therefore, the stack state becomes a state in which the screen data of the 'processing screen (first type)' is on the screen data of the 'standby screen'. The screen data of the 'processing screen (first type)' is screen data allowing the screens of all of the screen types 111 to be stacked thereon.

In step S221, the CPU 32 stacks the image data of the 'processing screen (second type)' at the top of the screen data storage area 33a. Therefore, the stack state becomes a state in which screen data of the 'processing screen (second type)' is on the screen data of the 'processing screen (first type)'. In the example of the present illustrative embodiment, it is allowed to transition the stack state of the screen data storage area 33a from the state shown in (B) of FIG. 8 to a state shown in (B) of FIG. 6 by the processes of steps S215 to S221. The screen data of the 'processing screen (second type)' is screen data allowing only the screen data of the 'server instruction screen' to be stacked thereon. Therefore, the transition to the server instruction display mode is completed. During a time period of the server instruction display mode, even if it is attempted to display the 'executing screen' on the panel 39, since the screen data of the 'executing screen' is not allowed to stacked in the screen data storage area 33a, the 'executing screen' is not displayed.

In step S223, the CPU 32 determines whether screen data of the 'server instruction screen' to be newly displayed on the panel 39 exists. If screen data of the 'server instruction screen' to be newly displayed does not exist (No in step S223), step S225 is skipped and the server instruction display process ends. Then, the CPU 32 returns to step S17 (FIG. 2). On the other hand, if screen data of the 'server instruction screen' to be newly displayed exists (Yes in step S223), the CPU 32 proceeds to step S225. In step S225, the CPU 32 executes a stack pushing process on the screen data of the 'server instruction screen'. Then, the server instruction display process ends, and the CPU 32 returns to step S17 (FIG. 2).

In the example of the present illustrative embodiment, in step S225, if the screen data of the 'server instruction screen' is stacked in the screen data storage area 33a, the stack state transitions from the state shown in (B) of FIG. 6 to a state shown in (A) of FIG. 6.

On the other hand, if it is determined to switch the default device display mode to the temporal device display mode in step S213, the CPU 32 proceeds to step S231. Examples of the case where it is determined to switch the default device display mode to the temporal device display mode include the case where the server execution instruction has been received (Yes in step S23). In step S231, the CPU 32 determines whether the image data stacked at the top is the 'server instruction screen'. If the image data at the top is the 'server instruction screen' (Yes in step S231), the CPU 32 proceeds to step S235 so as to perform a stack popping process, and then returns to step S231. If the image data stacked at the top is not the 'server instruction screen' (No in step S231), the CPU 32 determines that the image data of the 'processing screen (second type)' is at the top (the state of (B) of FIG. 6), and then proceeds to step S237.

In step S237, the CPU 32 executes a stack popping process. Therefore, the image data of the 'processing screen (second type)' is removed from the screen data storage area 33a. As a result, the stack state becomes a state in which the 'processing screen (first type)' is at the top of the screen data storage area 33a. In the example of the present illustrative embodiment, it is allowed to transition the stack state of the screen data storage area 33a from the state shown in (B) of FIG. 6 to a state shown in (B) of FIG. 7 by the processes of steps S231 to S237. The screen data of the 'processing screen (first type)' is screen data allowing the screens of all of the screen types 111 to be stacked thereon. Accordingly, the transition to the temporal device display mode is completed. During a time period of the temporal device display mode, since the screen data of the 'executing screen' is allowed to be stacked in the screen data storage area 33a, the 'executing screen' can be displayed on the panel 39. Therefore, it is allowed to display the 'executing screen' according to the server execution instruction.

In step S239, the CPU 32 determines whether screen data of the 'executing screen' that needs to be newly displayed on the panel 39 exists. Specifically, if a program controlling the printing operation requests the 'executing screen' which displays 'READING PRINT DATA' or the 'executing screen' which displays 'PRINTING' from the server application 21a, since screen data of the 'executing screen' requested to be newly displayed on the panel 39 is prepared, the screen data of the 'executing screen' that needs to be newly displayed on the panel 39 exists. If screen data of the 'executing screen' to be newly displayed does not exist (No in step S239), step S241 is skipped and the server instruction display process ends. Then, the CPU 32 returns to step S17 (FIG. 2). Meanwhile, if screen data of the 'executing screen' to be newly displayed exists (Yes in step S239), the CPU 32 proceeds to step S241. In step S241, the CPU 32 executes a stack pushing process on the screen data of the 'executing screen'. Then, the server instruction display process ends, and the CPU 32 returns to step S17 (FIG. 2).

In the example of the present illustrative embodiment, in step S241, if the screen data of the 'executing screen' is stacked in the screen data storage area 33*a*, the stack state transitions from the state shown in (B) of FIG. 7 to a state shown in (A) of FIG. 7.

<Effects>

In the MFP 51 according to the present illustrative embodiment, a screen based on an internal execution instruction acting as a trigger is not displayed during a time period (server instruction display mode) while a screen is being displayed by reception of the server display instruction from the web server 71. Therefore, it is possible to prevent a screen (the 'server instruction screen') based on a server display instruction acting as a trigger and a screen (the 'executing screen', the 'menu operation screen', or the like according to an internal execution instruction) based on an internal execution instruction acting a trigger from being displayed together. Therefore, it becomes easy for the user to recognize whether a displayed screen is based on a server display instruction or not, and thus convenience for the user can be improved.

In a case of employing a mode where the previous 'server instruction screen' is kept displayed on the panel 39 in a standby period from when the screen data of the previous 'server instruction screen' is received to when the screen data of the next 'server instruction screen' is received, the user may erroneously recognize that the MFP 51 freezes due to an error or the like. However, in the MFP 51 according to the present illustrative embodiment, a structure in which the screen data of the 'server instruction screen' is stacked on the screen data of the 'processing screen (second type)' is formed by the processes of steps S221 to S225. Therefore, in the standby period, it is possible to display the screen during processing on the panel 39 by removing the screen data of the previous 'server instruction screen' from the screen data storage area 33*a*. Therefore, it is possible to inform the user that the MFP 51 is in communication with the web server 71, and thus it is possible to prevent the erroneous recognition of the user.

If the priorities are assigned for each of the screen types 111 of the screen data, and control is performed such that the screen data with a priority lower than the priority of the screen data stacked at the top of the screen data storage area 33*a* is not allowed to be stacked on the screen data stacked at the top, when it is determined whether it is allowed to stack screen data thereon, it is impossible to taking into account a combination in which the screen data are stacked. However, in the MFP 51 according to the present illustrative embodiment, image data itself is associated with the types of screen data which are allowed to be stacked on the image data by the stackable information 112. Therefore, when it is determined in step S117 whether it is allowed to stack screen data in the screen data storage area 33*a*, since it is possible to take into account a combination in stacking the screen data, appropriate control becomes possible.

In the MFP 51 according to the present illustrative embodiment, if a server execution instruction is received from the web server 71 during a time period (the server instruction display mode) while a display instruction screen based on a server display instruction is being displayed, in step S237, transition to the temporal device display mode is allowed. In the temporal device display mode, the image data of the 'processing screen (first type)' (image data allowing screen data of all of the screen types 111 to be stacked thereon) is stacked at the top of the screen data storage area 33*a*. Therefore, even in the time period while the server display instruction is being received, it is possible to stack the screen data of the 'executing screen' based on a server execution instruction, in the screen data storage area 33*a*. Therefore, it is possible to display the 'executing screen' based on the server execution instruction acting as a trigger on the panel 39, and thus convenience for the user can be improved.

In the MFP 51 according to the present illustrative embodiment, it is allowed to stack the screen data of the 'standby screen' at the bottom of the screen data storage area 33*a* by the processes of steps S11 to S13. Accordingly, for example, if the MFP 51 has started, it is possible to display the 'standby screen' on the panel 39. Therefore, it becomes easy for the user to recognize that the MFP 51 is in the standby status, for example, during the start of the MFP 51, and thus convenience for the user can be improved.

While the present invention has been shown and described with reference to certain illustrative embodiments thereof, it will be understood by those skilled in the art that various changes in form and details may be made therein without departing from the spirit and scope of the invention as defined by the appended claims.

<Modifications>

In the above-described illustrative embodiment, in the server instruction display mode, the stack state becomes a state in which the screen data of the 'processing screen (second type)' is stacked on the screen data of the 'processing screen (first type)' (step S221); however, the present invention is not limited thereto. In the server instruction display mode, the stack state may be a state in which only the 'processing screen (first type)' is stacked. Then, in the server instruction display mode, control using a flag or the like may be performed such that it is not allowed to stack the screen data of the 'executing screen' in the screen data storage area 33*a*.

The screen example of the screen data 110 shown in FIG. 5 is just an example. Screen contents other then the screen shown in FIG. 5 may be used.

The technical elements described in the specification or the drawings can exhibit technical usefulness, either alone or in combination, and combinations are not limited to those described in the claims as filed. The techniques illustrated in the specification or the drawings can achieve a plurality of purposes at the same time, and achieving only one of them has technical usefulness.

What is claimed is:

1. A communication apparatus comprising:
   a first reception unit configured to receive an instruction from a server connected to a network;
   a second reception unit configured to receive an instruction from a path other than the server;
   a function executing unit configured to execute a function any of when the first reception unit receives a first execution instruction from the server and when the second reception unit receives a second execution instruction from the path other than the server;
   a display control unit configured to display a display instruction correspondence screen on a display unit when the first reception unit receives a display instruction from the server, and configured to display an execution correspondence screen on the display unit when the function executing unit executes the function,
wherein during a time period while the display instruction correspondence screen is being displayed, the display control unit displays the execution correspondence screen on the display unit when the first reception unit receives the first execution instruction, but does not display the execution correspondence screen on the display unit when the second reception unit receives the second execution instruction;
a screen data storage unit configured to store display instruction correspondence screen data which is screen data for displaying the display instruction correspondence screen, and execution correspondence screen data which is screen data for displaying the execution correspondence screen; and
a storage control unit configured to control the screen data storage unit to store the screen data in a stack data structure,
wherein the display control unit is configured to display a screen based on screen data stacked at a top of the stack data structure of the screen data storage unit,
the communication apparatus further comprising:
a stackable information storage unit configured to store stackable information representing, on each of the screen data, which screen data is allowed to be stacked; and
an instruction unit,
wherein when a trigger of attempting display of another screen on the display unit occurs, the instruction unit is configured to instruct the storage control unit to stack screen data for displaying the another screen at the top of the stack data structure or instruct the storage control unit to remove screen data stacked at the top of the stack data structure,
wherein the screen data storage unit is configured to further store screen data different from the display instruction correspondence screen data and different from the execution correspondence screen data,
wherein when instructed by the instruction unit and when the stackable information represents that the screen data stacked at the top of the stack data structure allows the screen data for displaying the another screen to be stacked thereon, the storage control unit is configured to execute a process of stacking the screen data for displaying the another screen at the top of the stack data structure,
wherein when instructed by the instruction unit and when the stackable information does not represent that the screen data stacked at the top of the stack data structure allows the screen data for displaying the another screen to be stacked thereon, the storage control unit is configured not to execute the process of stacking the screen data for displaying the another screen at the top of the stack data structure,
wherein the stackable information does not represent that the display instruction correspondence screen data allows the execution correspondence screen data to be stacked thereon,
wherein when the first reception unit receives the display instruction from the server, the instruction unit instructs the storage control unit to stack screen data, for which the stackable information represents that the screen data allows the execution correspondence screen data to be stacked thereon, at the top of the stack data structure, and then instructs the storage control unit to stack the display instruction correspondence screen data at the top of the stack data structure, and
wherein when the first reception unit receives the first execution instruction from the server, the instruction unit instructs the storage control unit to remove the screen data stacked at the top of the stack data structure.

2. The communication apparatus according to claim 1, wherein the screen data storage unit is configured to further store standby screen data which is screen data for displaying a standby screen, and
wherein the instruction unit instructs the storage control unit to stack the standby screen data at the top of the stack data structure when the communication apparatus is started, or when an instruction to end display of the display instruction correspondence screen is issued.

3. The communication apparatus according to claim 1, wherein the display instruction correspondence screen data includes:
processing screen data for displaying a screen for informing that processing is being performed, and
server instruction screen data for displaying a screen based on the display instruction received from the server, and
wherein the stackable information represents that the processing screen data allows the server instruction screen data to be stacked thereon.

4. A non-transitory computer-readable medium having a computer program stored thereon and readable by a computer of a communication apparatus, the computer program, when executed by the computer, causing the computer to perform operations comprising:
receiving an instruction from a server connected to a network;
receiving an instruction from a path other than the server;
executing a function in response to any of the following: receiving a first execution instruction from the server and receiving a second execution instruction from the path other than the server;
displaying a display instruction correspondence screen on a display unit when receiving a display instruction from the server, and displaying an execution correspondence screen on the display unit when executing the function,
during a time period while the display instruction correspondence screen is being displayed, displaying the execution correspondence screen on the display unit when receiving the first execution instruction from the server, but not displaying the execution correspondence screen on the display unit when receiving the second execution instruction from the path other than the server;
storing display instruction correspondence screen data which is screen data for displaying the display instruction correspondence screen, and execution correspondence screen data which is screen data for displaying the execution correspondence screen;
controlling the screen data storage unit to store the screen data in a stack data structure;
displaying a screen based on screen data stacked at a top of the stack data structure of the screen data storage unit;
storing stackable information representing, on each of the screen data, which screen data is allowed to be stacked,
wherein when a trigger of attempting display of another screen on the display unit occurs, stacking screen data for displaying the another screen at the top of the stack data structure or removing screen data stacked at the top of the stack data structure, further storing screen data different from the display instruction correspondence screen data and different from the execution correspondence screen data, wherein when the stackable information represents that the screen data stacked at the top of the stack data structure allows the screen data for displaying the another screen to be stacked thereon, executing a process of stacking the screen data for displaying the another screen at the top of the stack data structure, wherein when the stackable information does not represent that the screen data stacked at the top of the stack data structure allows the screen data for displaying the another screen to be stacked thereon, not executing the process of stacking the screen data for displaying the another screen at the top of the stack data structure, wherein the stackable information does not represent that the display instruction correspondence screen data allows the execution correspondence screen data to be stacked thereon, wherein when the display instruction is received from the server, stacking screen data, for which the stackable information represents that the screen data allows the execution correspondence screen data to be stacked thereon, at the top of the stack data structure, and then stacking the display instruction correspondence screen data at the top of the stack data structure, and wherein when the first execution instruction is received from the server, removing the screen data stacked at the top of the stack data structure.

\* \* \* \* \*